Figure 1:
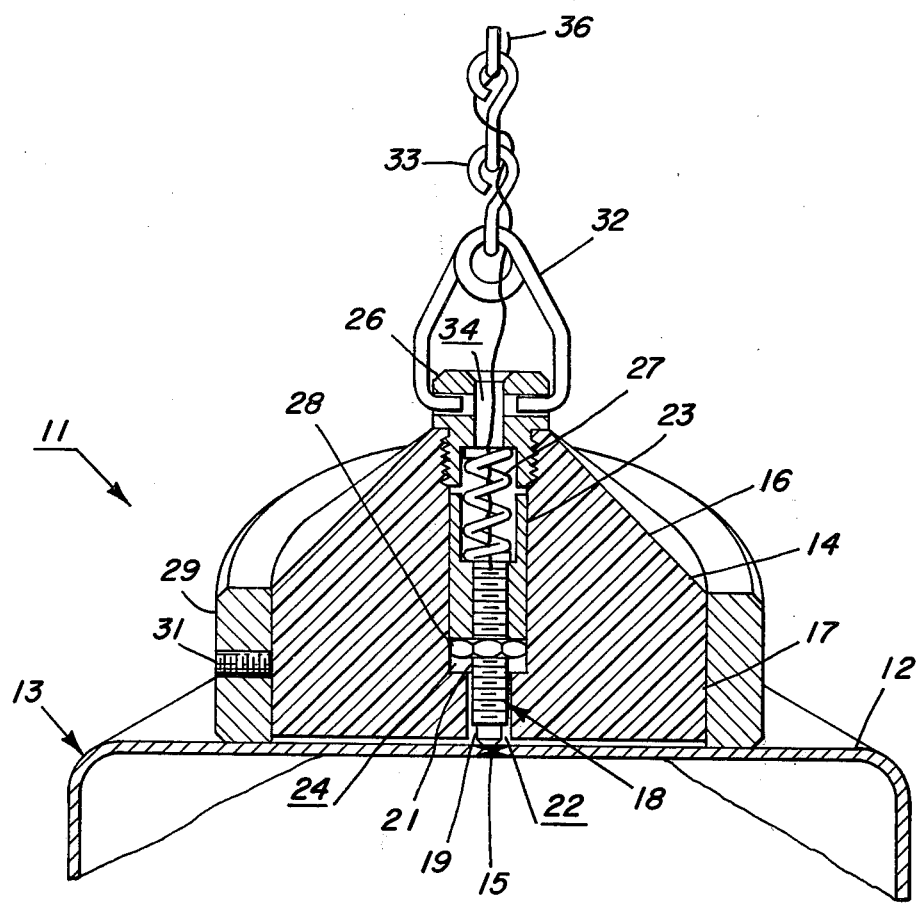

United States Patent [19]

Qurnell

[11] 4,145,251
[45] Mar. 20, 1979

[54] CORROSION MEASURING APPARATUS FOR RADIOACTIVE COMPONENTS

[75] Inventor: Frank D. Qurnell, San Jose, Calif.

[73] Assignee: General Electric Company, San Jose, Calif.

[21] Appl. No.: 805,649

[22] Filed: Jun. 13, 1977

[51] Int. Cl.² ............................................. G21C 17/00
[52] U.S. Cl. ............................... 176/19 R; 176/19 LD
[58] Field of Search ................... 176/19 R, 19 LD, 37, 176/38; 324/230

[56] References Cited

U.S. PATENT DOCUMENTS

| | | | |
|---|---|---|---|
| 2,503,720 | 4/1950 | Gieseke | 324/230 |
| 2,581,394 | 1/1952 | Dinger | 324/230 |
| 2,625,585 | 1/1953 | Krouse | 324/230 |
| 2,749,505 | 6/1956 | McNary | 324/230 |
| 2,887,651 | 5/1959 | Piip | 324/230 |
| 3,511,091 | 5/1970 | Thome | 176/19 R |
| 3,699,436 | 10/1972 | Shigematsu et al. | 176/19 R |
| 3,948,082 | 4/1976 | Zumbach et al. | 324/230 |
| 4,036,686 | 7/1977 | Weilbacher et al. | 176/19 R |
| 4,047,103 | 9/1977 | Day et al. | 176/19 R |

OTHER PUBLICATIONS

Materials Evaluation, vol. 32, No. 5 (5/74) pp. 93–99, S45290001, Dodd et al.

Primary Examiner—Samuel W. Engle
Assistant Examiner—S. A. Cangialosi
Attorney, Agent, or Firm—Ivor J. James, Jr.; Samuel E. Turner; Sam E. Laub

[57] ABSTRACT

Remotely manipulatable probe and apparatus for positioning a corrosion thickness sensing transducer over selected areas of the surface of a radioactive component submerged in a pool of water for radiation shielding.

9 Claims, 2 Drawing Figures

CORROSION MEASURING APPARATUS FOR RADIOACTIVE COMPONENTS

BACKGROUND

In known types of nuclear power reactors, for example as used in the Dresden Nuclear Power Station near Chicago, Ill., the reactor core comprises a plurality of spaced fuel assemblies arranged in an array capable of self-sustained nuclear fission reaction. The core is contained in a pressure vessel wherein it is submerged in a working fluid, such as light water, which serves both as coolant and as a neutron moderator. Each fuel assembly comprises a removable tubular flow channel, typically of approximately square cross section, surrounding an array of elongated, cladded fuel elements or rods containing suitable fuel material, such as uranium or plutonium oxide, supported between upper and lower tie plates. The fuel assemblies are supported in spaced array in the pressure vessel between an upper core grid and a lower core support plate. The lower tie plate of each fuel assembly is formed with a nose piece which fits in a socket in the core support plate for communication with a pressurized coolant supply chamber. The nose piece is formed with openings through which the pressurized coolant flows upward through the fuel assembly flow channels to remove heat from the fuel elements. A typical fuel assembly of this type is shown, for example, by B. A. Smith et al. in U.S. Pat. No. 3,689,358. An example of a fuel element or rod is shown in U.S. Pat. No. 3,378,458.

Additional information on nuclear power reactors may be found, for example, in "Nuclear Power Engineering", M. M. El-Wakil, McGraw-Hill Book Company, Inc., 1962.

While the various reactor components are thoroughly factory tested before being placed in the reactor, there is a continuing need for in-service inspection equipment which can rapidly and conveniently verify the integrity of or detect any anomalies in such components at the reactor site, particularly after such components have been subjected to reactor service and have, therefore, become radioactive. Such radioactive condition of used components requires remotely operable equipment which can examine such components under water to protect the test equipment operators from radiation.

A particular need is inspection equipment which can provide a nondestructive examination and quantitative indication of corrosion formation, such as oxide formation, on such reactor components. It is particularly desirable to provide corrosion measurement of removable reactor components which potentially have a relatively long service life such as fuel assembly flow channels.

For example, as mentioned above, each fuel assembly is surrounded by a removable tubular flow channel. While the normal service life of a fuel assembly in the reactor core is in the order of four years, the flow channel can be removed and reused on a replacement fuel assembly in the absence of excessive corrosion or other defects.

Previous methods of determining the extent of channel corrosion involved the cutting up of a channel and the shipping of samples of corroded portions to a laboratory for examination. This approach resulted in destruction of potentially reusable channels and an undesirable expenditure of time and money. Thus there is a need for remotely operable, nondestructive corrosion measuring equipment for determining whether or not a radiated component is fit for further service.

Fuel assembly channels are normally formed of a zirconium alloy made up of two U-shaped members welded together. They are usually factory processed by autoclaving (exposure to high temperature steam) to form a thin, tight protective oxide surface film of deep gray or black color.

In service oxide corrosion usually occurs at local areas, expecially at portions which have been exposed to highest temperatures and neutron flux density, and develops as clusters of pin point spots or nodules of corrosion which are light grey or white in color and which thus give the local area a "salt and pepper" appearance.

As such corrosion progresses, the nodules expand in area and eventually coalesce to form a continuous oxide corrosion film or sheet over the local area. Continued corrosion results in a thickening of the oxide film and eventual spalling, that is, a flaking off of the oxide particles. Under present procedures, the channel is removed from service before spalling is expected to occur to avoid contamination of the coolant with the oxide particles. Measurement of thickness of the corrosion film can be used to preduct the onset of spalling. Measurement of corrosion thickness can also be used to indicate the effectiveness of heat treatment and other processes used to provide improved corrosion resistance. It is also desirable to examine other local areas of the channel such as weld seams, for indications of corrosion.

Therefore it is an object of the invention to remotely and nondestructively measure formation of corrosion on a radioactive component.

It is another object of the invention to provide a corrosion thickness sensing means which readily and remotely can be positioned over a selected area of a radioactive component.

Equipment is commercially available which uses an eddy-current technique for indicating the distance between a transducer and a conductive surface. The transducer includes a coil which is energized by a high frequency current. Magnetic flux from the coil produces eddy currents in the conductive surface. Thus the power or energy supplied by the coil to produce the eddy currents is also proportional to the distance between the transducer and the conductive surface. This displacement dependent variation in power is detected by suitable electronic circuitry and converted to a calibrated display or recording of the distance between the transducer and the conductive surface. Thus such a device can be used to measure the thickness of a nonconductive coating on a metal.

It is another object of the invention to utilize an eddy-current technique to remotely measure thickness of corrosion on the surface of radioactive components.

SUMMARY

These and other objects of the invention are achieved by a transducer containing probe, suspended at the end of a manually manipulatable pole, which can be visually positioned over selected areas of a radioactive component submerged to a suitable depth in shielding water.

The probe comprises a body portion formed of transparent material and having the general shape of a frustum of a cone, the transducer being resiliently supported in a central bore of this body portion. Since the body portion transmits light and refracts light at its conical surface, the operator can, in effect, see through and beneath the probe to position the transducer over the desired local area of the component being examined.

In the illustrated embodiment, the body is surrounded by a ring of metal of sufficient weight to provide a desired force of the resiliently mounted transducer against the surface under examination.

DRAWING

Figure 2:
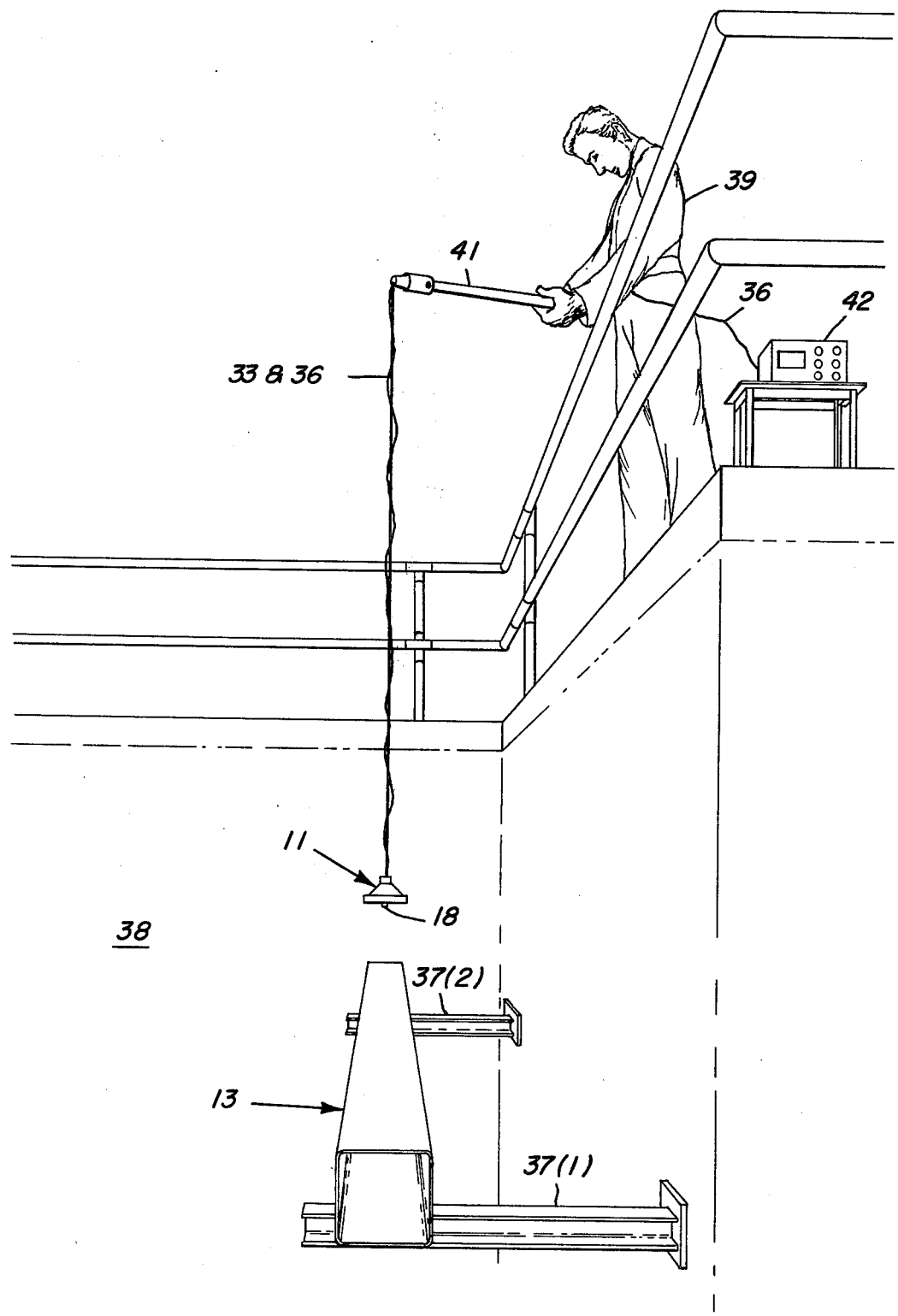

FIG. 1 is a partly cutaway perspective view illustrating the details of the probe of the invention; and FIG. 2 is a perspective and schematic view illustrating use of the probe of the invention for examining the outer surface of a fuel assembly channel in a water pool.

DESCRIPTION

A corrosion thickness measuring probe 11 is illustrated in FIG. 1 positioned on a surface 12 of a fuel assembly channel 13 over a weld seam 15 of the channel. The probe comprises a body 14 formed of transparent material, such as a suitable plastic, for example, methyl methacrylate. In longitudinal cross section, the body 14 has an upper portion 16 of the general shape of a frustum of a cone, that is, a frustro-conical shape, and a lower portion 17 cylindrical in shape.

A transducer 18 comprises suitable eddy current coils encapsulated in a rod 19 which is secured in a threaded sleeve 21. The rod 19 projects through a central bore 22 of the body 14 for contact with the surface under examination. The transducer sleeve 21 is threaded into a carrier 23 which is a sliding fit in a bore 24. A cap 26 is threaded into an upper bore of body 14. A spring 27 between the cap 26 and carrier 23 urges the carrier 23 and hence the transducer 18 downward and thereby provides a consistent force of the transducer against the surface 12. The transducer 18 can be screwed in or out of the carrier 23 to adjust this force, for example, to in the order of two pounds. A lock nut 28 is then tightened to maintain this adjustment.

The cylindrical portion 17 of the body 14 is surrounded by a metal ring 29, and fixed thereto by set screws 31, to give the probe 11 sufficient weight to overcome the spring force on the transducer 18 so that the ring 29 lays flat against the surface 12 when the probe is placed in a selected position thereon.

The cap 26 is fitted with bail 32 which is attached to a support member such as a lifting chain 33. The cap 26 is formed with a central bore 34 to pass a signal cable 36 from the transducer 18 upward along the chain to signal processing equipment (shown in FIG. 2).

In the illustrated embodiment of the probe 11, the conical upper portion 16 of the body 14 is formed at an angle of 45 degrees. Where the body 14 is formed of acrylic and used in a water medium, this angle provides appropriate light refraction to allow viewing through the body for positioning of the transducer 18 over a desired local area of the surface under examination. However, this angle may be selected to provide the best results for the particular material and medium and circumstances of use.

While the conical shape of the portion 16 is advantageous from the point of view of ease of machining, it is contemplated that the surface of the portion 16 may have a different shape such as curved, for example, convex.

Use of the inspection equipment of the invention is illustrated in FIG. 2. The fuel assembly channel 13 to be examined is supported by, for example, a pair of cantilever beams 37(1) and 37(2) under a suitable depth (for example, 1½ meters) of water in a pool 38 for shielding an operator 39 from radiation. The chain 33, from which the probe 11 is suspended, is attached at its top end to a pole 41 by which the operator 39 can manipulate the probe and place the transducer 18 thereof over selected local areas on the surface of the channel 13.

The signal cable 36 is supported by pole 41, along with chain 33, and is connected to suitable signal processing and display and/or recording apparatus 42. For example, the unit 42 can provide a digital display of the distance between the transducer 18 and the electrically conductive surface of the channel 13 and thus a direct indication of the thickness of the corrosion or oxide film on the surface of the channel.

The transducer 18 and processing unit 42 are commercially available items. Such devices employing the eddy-current technique are available, for example, from Kaman Sciences Corporation, Colorado Springs, Colo., the transducer 18 as a sensor model No. KD854151-040 and the unit 42 as gaging system model No. KD-2602.

Thus what has been described is remotely manipulatable apparatus for detecting the thickness of corrosion at selected areas on the surface of a radioactive component.

What is claimed is:

1. Apparatus for detecting the thickness of corrosion at selected areas on the surface of a radioactive component submerged in a body of transparent radiation shielding fluid, comprising: a probe including a body formed of transparent material; a transducer within a bore in said body; means for holding said transducer within said bore including means for allowing limited vertical movement of said transducer in said bore with respect to said body, the bottom end of said transducer normally projecting beyond a bottom surface of said body; remote means for manipulating and visually positioning said probe over the surface of said component and for resting said probe on said surface of said component with said transducer contacting a selected local area of said surface by viewing said local area through said body; resilient means for urging said transducer into contact with said local area, said transducer providing a signal proportional to the distance between said transducer and the electrically conductive surface of said component at said local area.

2. The apparatus of claim 1 further including means for processing said signal to provide an indication of said distance.

3. The apparatus of claim 1 wherein said body includes an upper portion having the general shape of a frustrum of a cone.

4. The apparatus of claim 1 wherein said body is formed of an acrylic material.

5. The apparatus of claim 1 wherein said body of fluid is a pool of water.

6. The apparatus of claim 1 wherein said means for manipulating said probe includes an elongated support means connected between said probe and the end of a pole by which said probe can be manipulated by an operator positioned at the edge of said body of fluid.

7. The apparatus of claim 3 wherein the surface of the conical portion of said body is at an angle of about 45 degrees to the longitudinal axis of said body.

8. The apparatus of claim 1 wherein said body includes a lower portion generally cylindrical in shape.

9. The apparatus of claim 7 including a ring of metal surrounding said lower portion of said body whereby said probe has a weight greater than the resilient force of said transducer against said surface of said component.

* * * * *